Sept. 29, 1970     F. L. DI VITA ET AL     3,531,140

TRACTOR QUICK HITCH ATTACHMENT

Filed Jan. 26, 1968     2 Sheets-Sheet 1

INVENTORS
FOSCO L. DI VITA
DONALD K. FADDEN

ATT'Y

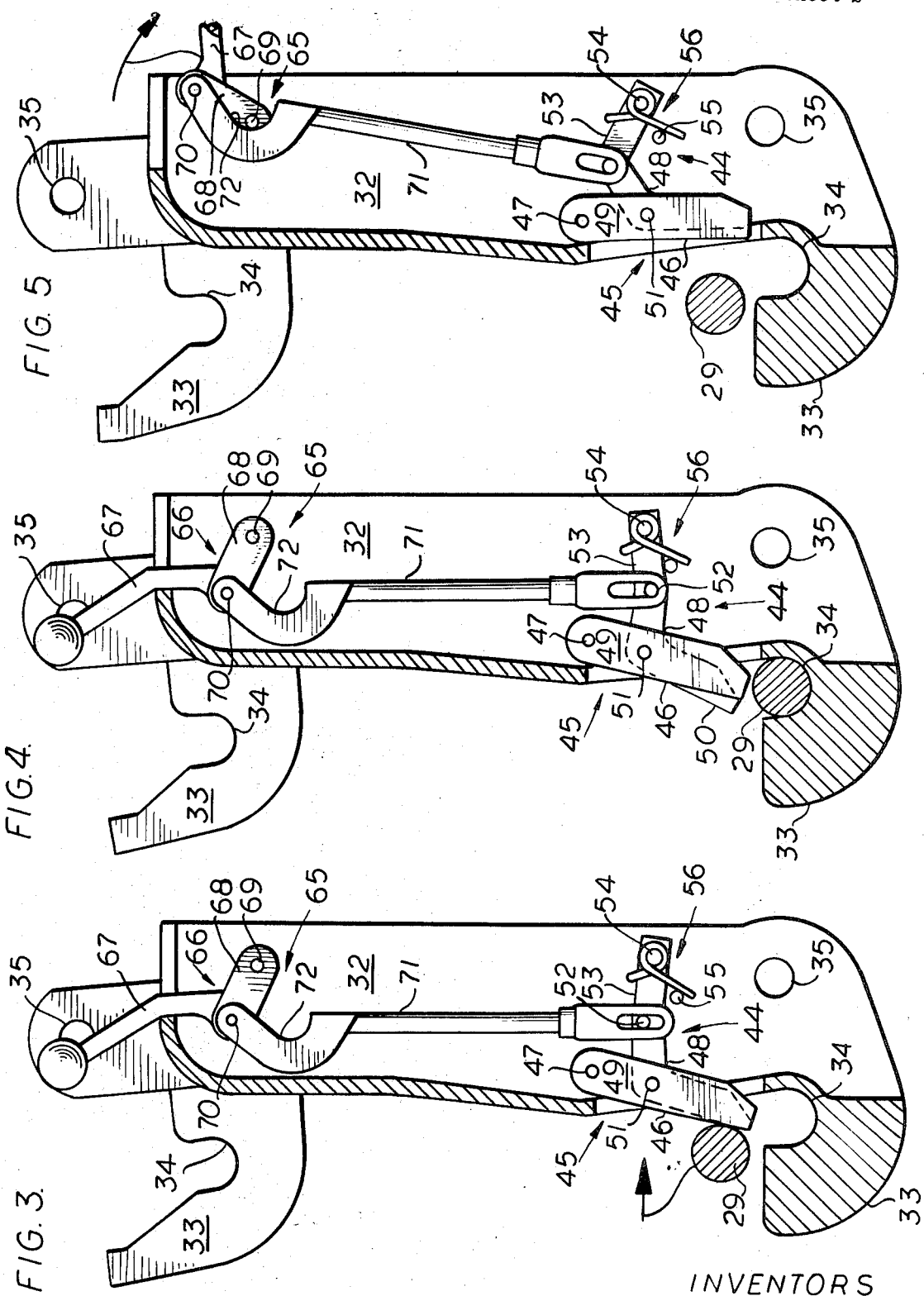

3,531,140
Patented Sept. 29, 1970

3,531,140
TRACTOR QUICK HITCH ATTACHMENT
Fosco L. Di Vita, Chicago, and Donald K. Fadden, Naperville, Ill., assignors to International Harvester Company, Chicago, Ill., a corporation of Delaware
Filed Jan. 26, 1968, Ser. No. 700,989
Int. Cl. B60d 1/00
U.S. Cl. 280—477     12 Claims

ABSTRACT OF THE DISCLOSURE

Apparatus for facilitating rapid attachment of an implement to a tractor of the three point hitch type having an inverted U-shaped frame made of a horizontal bar and two laterally spaced bars depending therefrom, hook means on said frame having a socket for engaging the attaching elements of an implement and an overcenter lock device attached to the laterally spaced bars for the purpose of engaging the attaching elements of the implement and locking the same within the socket.

BACKGROUND OF THE INVENTION

Our invention relates to an apparatus having means to permit and facilitate rapid attachment of an earth working implement to a tractor of the three point hitch type with a minimum exertion of effort and labor by the driver of the tractor. The prior art has proposed many varied mechanical devices for obtaining a suitable quick attachment means. However, in many of these devices the attaching means are subject to vibrational forces which may result in an uncoupling of the earth working implement. In other devices which have a suitable locking mechanism the coupling means often require undesirable manual effort by the driver of the tractor or else the devices are so complicated that they are uneconomical to build and maintain. Finally in some coupling means the draft forces of the implement operate in such a way upon the coupling means so as to create undesirable forces upon certain structural elements which are subject to fracture.

SUMMARY OF THE INVENTION

Our novel combination of elements providing for a quick hitch attachment basically comprises a U-shape frame having a horizontal bar and two laterally spaced bars depending therefrom with hook engaging means on said frame having a socket portion for receiving the attaching elements of an implement and an overcenter lock operating a latch bar about said hooks whereby the attaching elements of the implement may be placed within the sockets of the hooks and positively retained with no direct application of force by the tractor operator. Further the U-shape frame is provided with handle locking devices which in turn releases the overcenter lock and latch bar upon rotation by the driver and maintains same in a released position until further action by the driver, thus requiring no manual exertion of force during the subsequent uncoupling of the implement from the attachment.

It is therefore an object of this invention to provide a quick hitch attachment by which an implement can be coupled to a tractor without the necessity of any direct manual effort by the operator. It is also an object to provide a device for the class described which incorporates an overcenter lock which is completely free from any danger of uncoupling due to vibrational forces. It is a further object of our invention to provide a device in which a simple unidirectional movement easily accomplished by the driver will uncouple the overcenter lock and remain in the uncoupled position whereby the driver may merely drive away from the implement. Other objects and advantages of this invention will appear from the detail description and the drawings.

DESCRIPTION OF THE DRAWINGS

The manner in which the objects of the invention is attained will be made clear by consideration of the following specification and claims when taken in conjunction with the accompanying drawings in which:

FIG. 3 is a side view taken in section along line 5—5 disclosing the device in a position to receive the attaching elements of an implement;

FIG. 4 is a side view taken in section along lines 5—5 showing the device in a locked position;

FIG. 5 is a side view taken along lines 5—5 showing the device in an unlocked position.

DESCRIPTION OF THE PREFERRED EMBODIMENT

Figure 1:
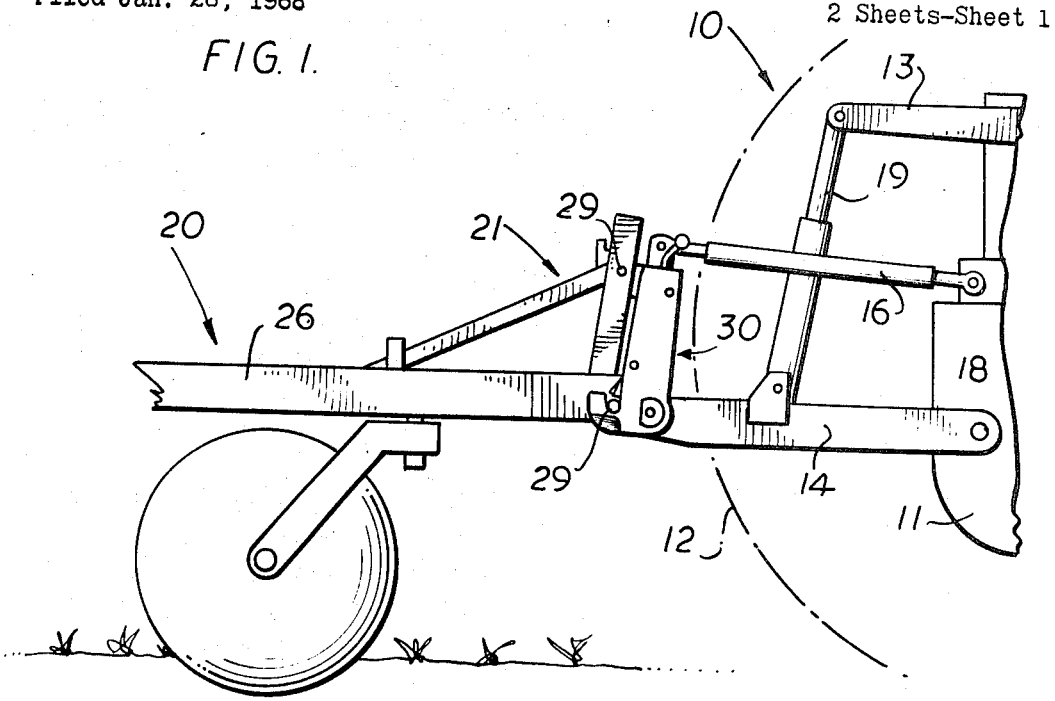
FIG. 1 is a side elevational view of the quick hitch attachment shown in its operative relationship to a tractor and an earth working implement.

A preferred embodiment of our invention as illustrated in the drawings discloses our quick hitch attachment 30 in operative relationship with a tractor 10 and a plow 20. The tractor has a rear axle housing 11 suitably supported on the ground wheels 12. (Since the lower draft links and lift arms on each side of the axle housing are identical, only one of these linkages are shown in FIG. 1). The rear axle housing 11 is provided with power lift arms 13 being disposed upon opposite sides of the housing 11 and being actuated by suitable hydraulic mechanism within the axle (not shown) for clockwise and counterclockwise movement about housing 11. Two lower draft links 14 are a part of the conventional three point hitch which is incorporated in many tractors and are transversely spaced and connected to a lower portion of the axle housing 11 by means of pivotable connections 18. Lifting links 19 are then interposed between the power lift arms 13 and the lower draft links 14 by conventional means whereby rotational movement of the power lift arms will raise or lower draft links 14. An upper adjustable trailing link 16 is pivotably connected to the rear axle housing 11 above the lower draft links 14 completing the hitch assembly.

A trailing implement is generally designated at 20 which is provided with one or more ground engaging tools (not shown) which are in turn connected to a longitudinally extending implement frame 26 having at its forward end an implement hitch frame generally designated 21. The implement hitch frame 21 (not a part of this invention) normally comprises a triangular shaped element having an implement pin 29 at each apex of the triangle which is horizontally disposed so as to be engageable by the conventional three point hitch or the quick hitch attachment of the instant application.

Interposed between the aforedescribed tractor and plow is the quick hitch attachment which is the subject of the present invention. This quick hitch attachment comprises basically an inverted U-shaped frame 30 having a horizontal upper bar 31, two laterally spaced integral legs 32 and suitable apertures 35 and connecting means 36 for attachment to the draft links. These laterally spaced legs may be manufactured from tubular casing or a hollow rectangular rod within which is mounted the locking mechanisms presently to be described. Finally, affixed near the center of the horizontal bar and upon the lower ends of the laterally spaced legs are three implement engaging hooks 33. Within each hook is a socket section designated as 34. An overcenter lock device 45 (see FIGS. 3–5) is incorporated into the two laterally spaced bars 32 and operate about the two lower implement engaging hooks 33.

By reference to the cross section view of only one of these spaced bars 32 it will be seen that the overcenter lock device 45 comprises two basic elements; a latch bar 46 and an overcenter lock generally designated 44. The latch bar is pivotally hinged upon the laterally spaced legs at 47 and depends downward into the socket section 34 of the implement engaging hook 33. The overcenter lock 44 comprises a first link 53 which is pivotally connected at 54 to the laterally extending leg transversely of said latch bar. The link 53 extends from its pivotal connection 54 horizontally towards the latch bar. At the other end of this horizontal link 53 is one arm 49 of a bellcrank element 48 attached thereto by pin connection 52. The bellcrank 48 is also pivotally connected to the latch bar 46 by a second pin connection 51. Obviously any lateral movement of the latch arm requires a vertical displacement of pin connection 51 since bellcrank arm 49 and link 53 cannot be compressed. The second arm 50 of the bellcrank depends downward and into the socket section 34 of the implement engaging hooks 33. Preferably this second arm 50 of the bellcrank 48 normally depends outwardly at an angle from said latch bar 46 for a purpose thereinafter to be explained.

Below the first horizontal link element 53 is an abutment 55 which is situated at a distance below a center line of element 53 and bellcrank arm 49 when these elements are horizontal. Thus, when horizontal link element 53 is resting against its abutment 55, no rotational movement of the latch bar 46 may occur. This is due to fact that the longitudinal axis of the horizontal link 53 and the arm 49 of the bellcrank 48 form an obtuse angle or an overcenter position and cannot move downward due to the abutment nor can they move upward due to the spring pressures forcing the link 53 and the bellcrank arm 49 into this overcentering position, such displacement being necessary to lateral movement of the latch arm. Consequently once an implement attaching element 29 is locked within the socket section 34 of the implement engaging hooks 33 by the overcenter lock device only a direct vertical motion upon pin connection 52 will permit a lateral movement of the latch bar 46.

Figure 6:
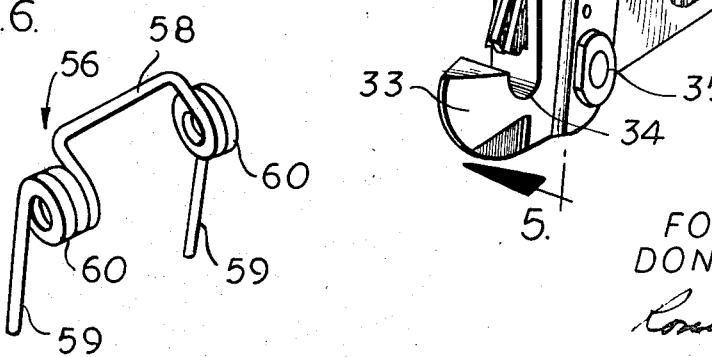
FIG. 6 is a perspective view of the spring means which is incorporated into the locking advice.

The spring pressure which operates upon link 53 may be created by a spring 56 as shown in FIG. 6. Between the coils 60, 60 extends a shoulder 58 or horizontal portion which rides upon link 53 while legs 59, 59 depend downward and engage abutment 55, thus placing the spring in torsion. Preferably, the coils are held in position by pivotal connection 54 which extends through them.

The vertical movement of pin connection 52 and the subsequent horizontal movement of latch bar 46 which causes the unlocking of the device may be accomplished in either of two ways. First an operator's handle locking device 65 is provided whereby the operator of the tractor may by a unilateral motion unlock the latch bar 46. This handle locking device comprises a second bellcrank 66 which is pivotally connected to the lateral bar 32 at one end of one arm 68 by pivotal element 69. At the vertex of the bellcrank is a pin connection 70 which connects an actuating rod 71 to the bellcrank 66. The second arm 67 of the bellcrank 66 may be utilized as a manual operating arm which extends outside of the laterally spaced legs whereby it is accessible to the operator. The actuating rod 71 is also connected to pin connection 52 of the overcenter lock device aforementioned. This connection is effected by a cutout 72 in the actuating rod which is elongated for a purpose to be explained. Thus when the operator of the tractor rotates the operating arm downward it will be observed that the actuating arm 71 causes the pin connection 52 to move vertically upward. This upward movement thereby releases the locking elements (link 53 and bellcrank arm 49) from their overcenter position, causing the latch bar 46 to move horizontally inward toward the laterally spaced leg 32 and implement pins 29 may be subsequently removed from hooks 33 by lowering the quick hitch attachment.

As disclosed in the preferred embodiment, the upper end of the actuating rod 71 may be provided with an arcuate or bow shaped configuration 72 just below pivotal connection 70 with the center of the arc being approximately coincident with pin connection 69. As the operating arm 67 is rotated downward, pivotal connection 70 is rotated above and to the right of pin 69, and the arcuate configuration 72 abuts pin 69 thus limiting further downward movement of the arm 67. Consequently, as spring 56 urges link 53 counterclockwise, the actuating rod 71 is urged downward, and the arcuate configuration 72 is urged more tightly against pin 69 since downward movement of rod 71 is possible only through continued clockwise rotation of operating handle 67. Therefore, the handle locking device 65 will positively lock the latch bar 46 in an open position whereby the implement pins 29 may be removed from socket 34 without further continued manual effort by the operator. (It should be noted however, that this overcenter lock device could be replaced by a single elongated actuating rod which extends outwardly from the laterally spaced bars.)

The second way of effecting vertical movement of pin 52 and subsequent unlocking of the latch bar is afforded by the arm 50 of the bellcrank which depends downward from the latch bar. It will be observed that a horizontal force along this arm 50 will cause the second arm 49 of the bellcrank 48 to rotate upward thereby causing the overcenter lock device to invert the angles of the axis of this arm 49 and the horizontal link 53. Upon this inversion, the latch bar is unlocked and the implement attaching bars 29 are free to enter the socket and the spring 56 will again urge the overcenter lock into the lock position forcing latch bar 46 over the implement attaching bar 29. The elongated cutout 72 in rod 71 permits upward movement of pin connection 52 without any vertical displacement of rod 71 thereby preventing any movement of the handle locking device from its upward, unlocked position.

MODE OF OPERATION

Figure 2:
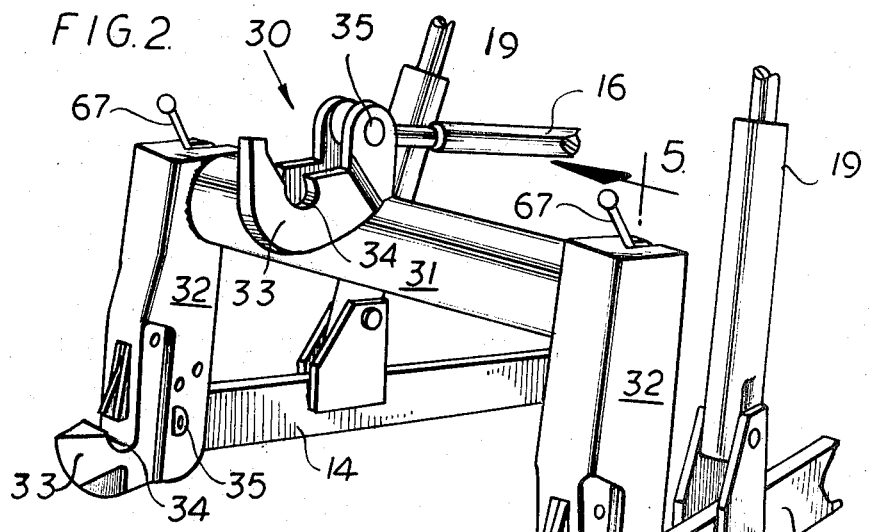
FIG. 2 is a perspective view of the quick hitch attachment itself.

During normal operation of the tractor vehicle the operator will have the quick hitch attachment connected to the conventional three point hitch of the tractor. This is done by placing the lower draft links 14 and the upper adjustable trailing link 16, adjacent the apertures in the quick hitch attachment as indicated in FIGS. 1 and 2 and then placing attaching pins with the apertures thereby joining the quick hitch attachment to the three point hitch. Assuming that the operator of the tractor now desires to attach an implement 20 to his tractor, the operator merely actuates his position control to lower the quick hitch attachment and then backs the tractor towards the plow 20. As the upper implement engaging hook 33 is moved underneath the implement attaching pin 24 the operator of the tractor stops the rearward movement of the vehicle and then operates his position control to move the three point hitch upward. As the hitch is being moved upward the upper hook 33 engages the upper implement pin 29 of the plow 20. Continued upper motion of the quick hitch attachment causes the lower implement pins 29 to engage lower hooks 33 and as the lower implement attaching pins 29 approach the socket sections 34 they will impart a horizontal force upon the trigger element 50 thereby causing a vertical movement of pin connection 52. This pin connection 52 moving upward causes the overcenter lock to uncouple itself thus releasing the latch bar 46 from its locked position. The latch bar 46 is then moved inward toward the laterally spaced bar and the implement pin 29 seats itself within the socket section 34, of the implement engaging hooks 33. Once these implement pins 29 are seated within the socket 34, the spring element 56 acting upon link element 33 causes the link to rotate about its pivot point 54 in a counterclockwise direction thereby moving the overcenter lock into the locked position and forcing the latch bar 46 outward into a locked position above the implement pin. In this condition the implement or plow 20 is firmly attached to the tractor.

To uncouple the implement 20 from the tractor 10 the operator of the tractor from his normal operator's position merely rotates each of the operating handles 67 in a clockwise direction. The operating handle as it rotates about its pivot 69 causes the actuating arm 71 to move vertically upward. Continued rotation of the operating arm will cause the pin connection 70 to move to the right of and overcenter itself above and to the right of pivotal connection 69. At this time the operator may release the operating arm 67 and such will remain in its downward position due to the overcenter lock mechanism 65. When the operating handle 67 is in its open or locked position the actuating arm 71 is up and the overcenter lock 44 has been inverted causing the latch bar 46 to move inward and the implement pins 29, are free to be removed from the socket portions 34. At this time the operator of the tractor merely actuates his position control to lower the lower draft links 14 and the upper adjustable trailing link 16 which in turn lowers the quick hitch attachment and the tractor is thereby disengaged from the plow 20.

In effecting the attachment between the quick hitch attachment and the implement it will be observed that the tractor operator has applied no manual force directly to the quick hitch attachment. All that has been required of the operator is that he merely place his vehicle and the quick hitch attachment in proper juxta-position relevant to the plow 20 and raise the quick hitch attachment by the conventional position control mounted on most tractors. To disconnect a plow from the tractor the driver is only required to exert a downward force upon his operating handles and once this action is effected the quick hitch attachment was placed in an uncoupling position with no further direct action required by the operator of the vehicle. Further it will be noted that due to the two overlocking systems, one incorporated in the operator's handle 65 and the other incorporated with the latch bar element 46 permit a minimum exertion of effort on the part of the operator and at the same time provide a coupling device which in conjunction with the quick hitch attachment will positively engage an implement 20 and due to the nature of these overcenter locks the quick hitch attachment is not subject to vibrational forces.

It is also contemplated that the subject matter of this invention may be used for coupling any drag type vehicle to any pulling vehicle. For instance, only one of the laterally spaced bars and its locking mechanism might be employed as coupling means between a truck and trailer.

As this invention may be embodied in several forms without departing from the spirit or essential characteristics thereof the present embodiment is therefore illustrative and not restrictive and since the scope of the invention is defined by the appended claims all changes that fall within the needs and bounds of the claims or that form their functional as well as conjointly cooperative equivalents are therefore intended to be embraced by those claims.

We claim:
1. An apparatus for coupling the attaching element of a drag type vehicle to a tractor means comprising:
    (a) a hollow elongated bar fixed to a tractor means,
    (b) hook means on said bar having a socket portion for receiving the attaching element,
    (c) an overcenter lock means including a trigger element attached to said bar about the socket portion for engagement by the attaching element of a drag type vehicle whereby said attaching element may be firmly secured within said hook after first opening said lock means by actuation of said trigger element.
2. An apparatus for coupling the attaching element of a drag type vehicle to a tractor means comprising:
    (a) a hollow elongated bar fixed to the tractor,
    (b) hook means on said bar having a socket portion for receiving the attaching element,
    (c) a latch bar pivotally connected to said elongated bar and depending downwards towards the socket portion, and
    (d) an overcenter lock attached to said elongated bar and to said latch bar whereby the attaching element of a drag type vehicle is locked within the socket portion until the overcenter lock is released, and
    (e) a lock mechanism having overcenter lock means connected to said overcenter lock and to the elongated bar whereby said overcenter lock may be released and said latch bars withdrawn from their locking position.
3. A device as recited in claim 2 in which said overcenter lock comprises:
    (a) horizontal link pivotally connected to said elongated bar,
    (b) an abutment below said horizontal link,
    (c) spring means urging said link downward against the abutment,
    (d) a bellcrank element having one arm pivotally connected to said horizontal link and its vertex pivotally connected to said latch bar with its second arm depending downward and outward from said pivotal connection whereby a horizontal force upon said second arm will cause the bellcrank to rotate upward thereby releasing said overcenter lock.
4. A device as recited in claim 2 in which said overcenter lock mechanism comprises:
    (a) a bellcrank having one end pivotally connected to said elongated bar,
    (b) an actuating element having one end pivotally connected to the vertex of the bellcrank and its other end connected to said overcenter lock,
    (c) said other end of the bellcrank extending outwardly of said elongated bar so as to serve as an operating handle whereby upon rotation of said other end about its first end raises the actuating link and unlocks said overcenter lock.
5. A quick hitch attachment for a tractor of the three point hitch type having a pair of spaced apart lower links and upper hitch link comprising:
    (a) an inverted U-shape frame having a horizontal bar and two laterally spaced bars depending from the horizontal bar,
    (b) means on said frame permitting its attachment to lower and upper hitch links of a tractor,
    (c) hook means on said frame having a socket portion for receiving the attaching elements of an implement,
    (d) latch bars which extend from said laterally spaced bars towards said socket portions of the hooks so as to lock the attaching elements of an implement within the sockets,
    (e) overcenter locks attached to said laterally spaced bars and said latch bars whereby the latches are locked above the socket portion of the hooks until said overcenter lock is released,
    (f) trigger means interconnected with said overcenter locks and extending towards said socket means at an angle with said latch bars for permitting the attaching elements of an implement to release said overcenter lock and enter the socket portion.
6. A device as recited in claim 5 including
    (a) overcenter lock mechanisms vertically disposed above and connected to said overcenter locks whereby said overcenter locks may be released and said latch bars are withdrawn from their locking position.

7. A device as recited in claim 6 in which overcenter lock mechanisms comprise:
   (a) a bellcrank having one end pivotally connected to said laterally spaced bars,
   (b) an actuating element having one end pivotally connected to the vertex of the bellcrank and its other end connected to said overcenter lock,
   (c) said other end of the bellcrank extended outward of said laterally spaced bar and serving as an operating handle whereby rotation of said other end about its first end raises the actuating link and unlocks said overcenter lock.

8. A device as recited in claim 6 in which said overcenter locks comprise:
   (a) horizontal link pivotally connected to said laterally spaced bars,
   (b) an abutment below said horizontal link,
   (c) spring means urging said link downward against the abutment.
   (d) a second horizontal link having one end pivotally connected to said first horizontal link and its other end pivotally connected to said latch bar whereby upward movement upon the pivotal connection between the two links withdraws the latch bars from a locked position and downward movement causes the latch bars to move into a locking position, and
   (e) said trigger means includes an arm depending downward from said pivotal connection with said latch bar at such an angle as to cause upward movement of the pivotal connection between the links upon exertion of a horizontal force against said downward depending arm.

9. A device as recited in claim 5 in which said overcenter locks comprise:
   (a) a horizontal link pivotally connected to said laterally spaced bars and extending horizontally towards said latch bar,
   (b) a bellcrank element having one arm pivotally connected to said horizontal link with its vertex pivotally connected to said latch bar and its other arm depending downward and outward from said pivotable connection to serve as the trigger means such that a horizontal force will cause the bellcrank to rotate counterclockwise,
   (c) spring means urging said horizontal link in a counterclockwise direction,
   (d) an abutment below said horizontal link whereby the axis of the bellcrank arm and the horizontal link are in an overcenter position upon engagement of the abutment and the horizontal link.

10. A device as recited in claim 9 including
    (a) overcenter lock mechanisms connected to said overcenter lock whereby said overcenter locks may be released and said latch bars are withdrawn from their locking position above the socket.

11. In a quick hitch attachment for a tractor having a U-shaped frame, means for attachment to the tractor, upper and lower hook means on said frame having socket portions for receiving the attaching elements of an implement, the improvement comprising:
    (a) a latch bar pivotally connected to said frame and extending to a position normally above said lower socket portion for locking an implement pin within the socket portion,
    (b) an overcenter lock having one end pivotally connected to the frame and the other end pivotally connected to the latch bar, said lock positioned substantially normal to said latch bar,
    (c) automatic unlatching means extending from for said overcenter lock, whereby engagement of said attaching elements with said unlatching means will open said overcenter lock and said socket portions to permit seating of said elements in said socket portions.

12. A device as recited in claim 11 in which a manual unlatching means is provided for said overcenter lock, said manual unlatching means comprising: an elongated actuating rod attached to the pivotal connection between the two elongated links and extends outwardly from said frame whereby said pivotal connection between said links may be urged away from said abutment thereby unlocking the overcenter lock and withdrawing the latch bar from the locked position above the socket portion.

References Cited
UNITED STATES PATENTS

| | | | |
|---|---|---|---|
| 3,048,228 | 8/1962 | Hess et al. | 172—272 |
| 3,172,686 | 3/1965 | Beard | 280—479 XR |
| 3,231,294 | 1/1966 | Horney | 280—479 XR |

BENJAMIN HERSH, Primary Examiner

M. L. SMITH, Assistant Examiner

U.S. Cl. X.R.

172—275